April 15, 1969 R. KÄHNE 3,439,256
INDUCTIVE ANGULAR POSITION TRANSMITTER
Filed Feb. 23, 1967

PART A

PART B

PART A

PART B

INVENTOR
ROBERT KÄHNE

BY
ATTORNEYS

United States Patent Office 3,439,256
Patented Apr. 15, 1969

3,439,256
INDUCTIVE ANGULAR POSITION TRANSMITTER
Robert Kähne, Bad Friedrichshall, Germany, assignor to Merckle Flugzeugwerke G.m.b.H., Oedheim Wurttemberg, Germany
Filed Feb. 23, 1967, Ser. No. 618,163
Claims priority, application Germany, Feb. 23, 1966, M 68,491
Int. Cl. H02p 13/10
U.S. Cl. 323—51      7 Claims

ABSTRACT OF THE DISCLOSURE

An inductive angular position transmitter comprised by stationary, inductively coupled primary and secondary windings positioned at right angles with respect to each other. A supply alternating voltage is fed to the primary winding. An asymmetrical eddy current element (preferably in the form of a slotted, cylindrically-shaped, aluminum tube) surrounds the primary and secondary windings and is rotatable with respect thereto by the device whose angular position is to be measured. The slotted tube causes a distortion of the magnetic field produced by the primary winding which distortion is dependent upon the angular position of the slot in the tube relative to the winding. As a consequence a voltage is induced in the secondary winding which is dependent upon the angular position of the slotted tube and whose amplitude and phase, as compared to a reference supply alternating voltage, is an indication of the angular position.

---

Figure 1:
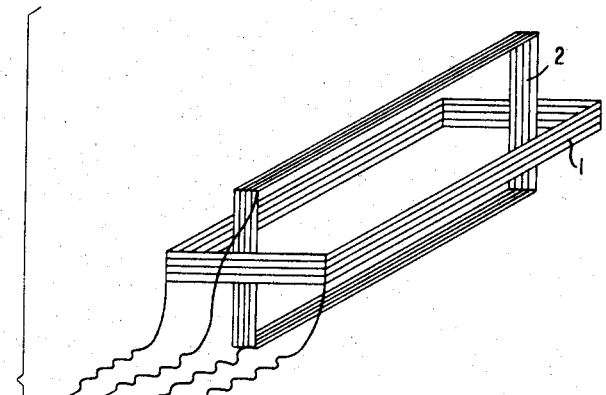

The present invention relates to an inductive angular position transmitter for transmitting from a remote location an electrical indication of angular positions, for example, for purposes of regulation and control.

Inductive angular position transmitters are known in the art in which a change in inductance in one or several coils is brought about by the rotary movement of a ferromagnetic part connected to an axle or other apparatus whose angular position is to be measured. By electrically measuring the change in inductance it is possible to ascertain by remote metering the desired angular position. Other known techniques involve correspondingly switching, for example, two inductances which are rotated in opposite directions by a rotary movement, into circuit relationship with an inductive half-bridge supplied with an alternating voltage. With such an arrangement it is possible to directly pick up an electric voltage whose amplitude and phase position serves as indication of the angular position with respect to one reference phase. This arrangement has the disadvantage, for some applications and uses, particularly in automatic control systems, that in case of an error (for example breakage of the wire in one coil) an extreme signal may occur.

Also known in the art are inductive angle transmitters which operate in accordance with the transformer principle and wherein, for example, the primary winding of the transformer is provided as a stator winding and the secondary winding is provided as a rotor winding. If the rotor is rotated with respect to the stator, the alternating voltage induced in the rotor is altered in amplitude and/or phase. This voltage may serve as indication for the measurement of angular position. However, this approach involves the disadvantage that as a result of greater torsion angles, the connection to the rotor must be effected by way of slip rings or similar structural elements which are susceptible to wear and tear.

Another known inductive angular position transmitter which operates according to the transformer principle employs several primary windings and the secondary windings are disposed in the stator and are rigidly provided with respect to each other. The rotor is provided with a multiphase short-circuit winding connected by way of a cross connection. The transmission of energy from the primary windings to the secondary windings takes place therein by means of the cross connected rotor windings. In this inductive angle transmitter, a constant output voltage is produced in the secondary winding whose phase position changes with respect to the stator as compared to a reference phase position during the torsion of the rotor, thus providing an indication for the torsion angle.

In order to overcome the difficulties encountered with the prior art angular position transmitters mentioned above, the present invention was devised.

The present invention makes available an improved inductive angular position transmitter having a novel mode of operation. In the angular position transmitter of the invention, primary and secondary coils are provided which are stationary with respect to each other and the transmitter is characterized in that an asymmetrical eddy-current element is provided. This asymmetrical eddy current element preferably is in the form of a slotted tube, made from non-magnetizable, electrically conductive material in a manner known per se, and rotatably disposed in a manner surrounding the primary and secondary windings such that a distortion of the magnetic field produced by the primary winding will be brought about due to the asymmetrical character of the element. This distortion is dependent upon the angular position between the windings and the asymmertical eddy-current element, whereby it is possible to induce in the secondary winding a voltage that is dependent upon the angular position of the eddy current element, and whose amplitude and phase position, as compared to a reference phase, is an indication of the angular position of the eddy current element.

As a consequence of the above described arrangement, the diameter of the inductive angular position transmitter as proposed by the invention may be considerably reduced as compared to the known constructions of inductive angular position transmitters. This results in the advantage that an angular position transmitter of this type may be installed, for example, directly into a hollow axle of a machine. Due to its particularly uncomplicated construction it provides good operational characteristics such as reliability of operation, performance, safety, etc. and low manufacturing costs. A further advantage consists in that electric connections are present only in a stationary part of the transmitter, so that slip rings or similar contact elements are not required even with torsion angles over and beyond 360°. In case of an error in the angular position transmiter (for example, breaking of a wire or winding connection to a coil), the output voltage becomes zero. This fail safe property is particularly advantageous when employing the angular position transmitter in controls or automatic control systems as compared to those known transmitters in which the maximum output voltage is present in case of a disturbance, break, etc.

Figure 2:
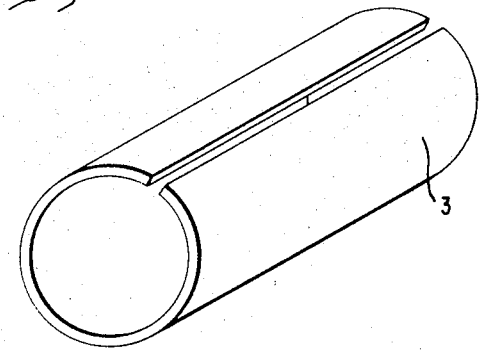
Figure 2:
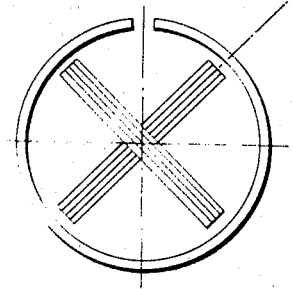
Figure 2:
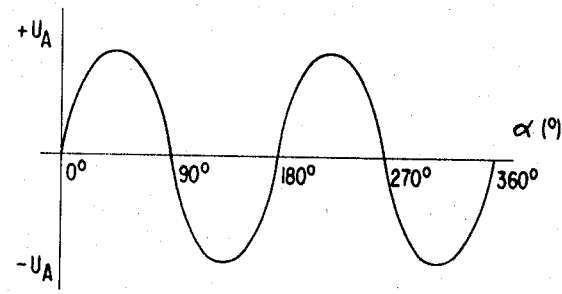

One possible embodiment of an inductive angular position transmitter according to the present invention is illustrated in the drawing, wherein FIGURE 1 shows in part A, the construction of the stationary primary and secondary coils 1 and 2 and in part B, the construction of the unsymmetrical eddy-current element; and FIGURE 2, part A is an end view of the assembled angular position transmitter, and part B is a plot of the output voltage versus rotation angle.

Part A of FIGURE 1 illustrates two coils 1 and 2 whose planes extend at an angle of 90° with respect to each other. As a result, in the absence of the tube 3 shown in part B during the supply of the coil 1 with an alternating voltage, the coil 2 would be intersected by the magnetic lines of force at an angle of 90° with respect to the magnetic field direction thereof, and no voltage would be induced in the coil 2. The coils may be constructed either in a self-supporting (cantilever) fashion, or may be wound on an angle element made from non-conductive and non-magnetizable material.

Part B of FIGURE 2 shows a cylindrical rotor tube 3 fabricated from electrically conducting and non-magnetizable material (for example aluminum) and slotted, in accordance with the present invention, on one side in the longitudinal direction thereof.

If the coil 1 and 2 shown in part A are positioned within tube 3 in the manner illustrated in FIGURE 2— Part A, the magnetic field produced by the coil 1 is markedly distorted in the geometric configuration thereof due to the influence of the eddy currents arising in the wall of the tubular part 3. On the side where the tube is provided with an elongated slot, smaller eddy currents will be formed than is the case on the opposite side. As a result thereof, an asymmetrical distortion will be produced. This distortion may be achieved also by a different asymmetrical configuration of the eddy current body or element 3.

If tube 3 is rotated with respect to coils 1 and 2, the position of the distorted magnetic field will change. As a result, an effect is brought about which is similar to that which would arise if the coil 1 were rotated in the position thereof relative to coil 2. In other words, a voltage is induced in the coil 2 which is dependent upon the angular position of the tube 3 and more particularly, upon the angular position of the slot in tube 3. The voltage induced in the coil 2 becomes zero when the elongated slot in tube 3 is provided in the angular positions 0°, 90°, 180°, and 270° (see FIGURE 2—Part B). The voltage in coil 2 becomes a maximum when the elongated slot is positioned in the angular positions 45°, 135°, 225° and 315°.

The output voltage from coil 2 can be obtained from the following equation:

$$V_A = kV_E \cdot \sin(2\alpha)$$

wherein:

$V_E$ is the alternating supply voltage for the coil 1
$V_A$ is the alternating output voltage in the coil 2
$k$ is the coupling factor between the coils 1 and 2
$\alpha$ is the torsion angle between part A and part B.

A negative sign of $V_A$ connotes that the output voltage is in phase opposition (or inversely pased $-\alpha = 180°$) as compared to the input voltage. On the basis of the equation given above, the inductive angular position transmitter as described herein produces, within the range of small torsion angles, an output voltage which is approximately proportional to the torsion angle. By the provision of, for example, several slots in tube 3 or a different configuration of tube 3, the output voltage developed as function of the torsion angle may be varied.

I claim:

1. An inductive angular position transmitter comprising stationary, inductively coupled primary and secondary windings positioned at right angles with respect to each other, means for applying a supply alternating voltage to the primary winding, an asymmetrical eddy current element fabricated from non-magnetizable and electrically conducting material surrounding said primary and secondary windings and rotatable with respect thereto in a manner such that a distortion of the magnetic field produced by the primary winding, is brought about by the asymmetrical eddy current element which distortion is dependent upon the angular position between the windings and the asymmetrical eddy-current element, and a voltage is induced in the secondary winding which depends upon the angular position of the asymmetrical eddy current element whose amplitude and phase position as compared to the supply alternating voltage is an indication of the angular position.

2. An inductive angular position transmitter according to claim 1 wherein the asymmetrical eddy current element is a slotted, cylindrically-shaped tube.

3. An inductive angular position transmitter according to claim 2 wherein the slotted tube is fabricated from aluminum and the slot extends longitudinally in a straight line along the full length of the tube.

4. An inductive angular position transmitter according to claim 1, wherein the design of the asymmetrical eddy current element is such that, due to its configuration and choice of material, the asymmetry of the eddy currents is so developed that the output voltage derived in the secondary winding in dependence upon the torsion angle of the asymmetrical eddy current element is adapted to a chosen function.

5. An inductive angular position transmitter according to claim 4 wherein the chosen function is expressed by the relation $$V_A = KV_E \sin(2\alpha)$$

where:

$V_A$ is the alternating output voltage in the secondary winding
$V_E$ is the supply alternating voltage
$K$ is the coupling factor between the primary and secondary windings
$\alpha$ is the torsion angle between the asymmetrical eddy current element and the windings.

6. An inductive angular position transmitter according to claim 5 wherein the asymmetrical eddy current element is a slotted, cylindrically-shaped tube.

7. An inductive angular position transmitter according to claim 6 wherein the slotted tube is fabricated from aluminum and the slot extends longitudinally in a straight line along the full length of the tube.

References Cited

UNITED STATES PATENTS

| | | | |
|---|---|---|---|
| 2,700,739 | 1/1955 | Orlando | 336—79 X |
| 3,164,993 | 1/1965 | Schmidt | 324—40 X |
| 3,202,914 | 8/1965 | Deem et al. | 324—40 X |

JOHN F. COUCH, *Primary Examiner.*

G. GOLDBERG, *Assistant Examiner.*

U.S. Cl. X.R.

324—40; 336—87